(12) United States Patent
Schütz (10) Patent No.: US 7,866,501 B2
(45) Date of Patent: Jan. 11, 2011

(54) TUBULAR RIVET CONNECTION FOR COMPONENTS OF METAL, PLASTIC OR WOOD, ESPECIALLY FOR ASSEMBLING TRANSPORT AND STORAGE CONTAINERS FOR LIQUIDS AND FLOWABLE MATERIAL

(75) Inventor: Udo Schütz, Selters/Westerwald (DE)

(73) Assignee: Schütz GmbH & Co. KGaA, Selters/Westerwald (DE)

( * ) Notice: Subject to any disclaimer, the term of this patent is extended or adjusted under 35 U.S.C. 154(b) by 944 days.

(21) Appl. No.: 11/061,851

(22) Filed: Feb. 18, 2005

(65) Prior Publication Data

US 2005/0196252 A1 Sep. 8, 2005

(30) Foreign Application Priority Data

Feb. 27, 2004 (DE) .................... 20 2004 003 020 U (51) Int. Cl.
*B65D 90/04* (2006.01)
(52) U.S. Cl. ..................... 220/23.91; 206/386
(58) Field of Classification Search ........................ None
See application file for complete search history.

(56) References Cited

U.S. PATENT DOCUMENTS

| | | | | | |
|---|---|---|---|---|---|
| 3,952,913 A | * | 4/1976 | Khoury | ....................... | 220/273 |
| 5,253,777 A | * | 10/1993 | Schutz | ....................... | 220/571 |
| 6,202,844 B1 | * | 3/2001 | Sedlmayr | .................... | 206/386 |
| 6,719,162 B2 | * | 4/2004 | Przytulla | ................. | 220/23.91 |

FOREIGN PATENT DOCUMENTS

DE 100 62 088 6/2002

* cited by examiner

*Primary Examiner*—Stephen Castellano
(74) *Attorney, Agent, or Firm*—Friedrich Kueffner

(57) ABSTRACT

A tubular rivet connection is provided for assembling a transport and storage container that has a support frame, an inner plastic container with a filling socket and a discharge socket, and an exterior jacket. The support frame for the inner container has corner and center legs mounted on a base frame. The top of the support frame and the exterior jacket are attached to the corner legs and center legs by the tubular rivet connection that has a tubular rivet stem connected to a first component; the tubular rivet stem is formed as a monolithic part of the first component or is a separate part welded to the first component. A second component to be riveted to the first component has a rivet hole. A free end of the tubular rivet stem that projects past the second component after insertion into the rivet hole is deformed to a driven head.

10 Claims, 10 Drawing Sheets

TUBULAR RIVET CONNECTION FOR COMPONENTS OF METAL, PLASTIC OR WOOD, ESPECIALLY FOR ASSEMBLING TRANSPORT AND STORAGE CONTAINERS FOR LIQUIDS AND FLOWABLE MATERIAL

BACKGROUND OF THE INVENTION

1. Field of the Invention

The invention relates to a tubular rivet connection for assembling transport and storage containers for liquids and flowable material (bulk material). The transport and storage containers are provided with a pallet-like support frame, an inner container of plastic material resting on the support frame and comprising a closable filling socket and a discharge socket to be connected to a discharge fitting, and with an exterior jacket in the form of a grid jacket or sheet metal jacket. The support frame has a top for supporting the inner container and also has corner legs and center legs made of metal that are mounted on a base frame made of metal or skids made of metal, plastic or wood, wherein the bottom of the support frame as well as the exterior jacket of the inner container are attached to the corner legs and the center legs.

2. Description of the Related Art

When assembling transport and storage containers for liquids of the aforementioned kind as disclosed in DE 100 62 088 C2, the underframe of the metal grid basket and the sheet metal top of the pallet-like support frame on which the inner plastic container for liquids rests are screwed to the corner or center legs of the support frame and the legs are welded to the base frame of the underframe. Because of the employed different connecting techniques and the resulting significant assembly expenditure as well as the small parts required for mounting, e.g., sheet-metal or self-tapping screws and washers, the manufacturing costs of the liquid container are accordingly high.

SUMMARY OF THE INVENTION

It is an object of the present invention to develop a connection technique for individual components of a transport and storage container for liquids and bulk material.

In accordance with the present invention, this is achieved in that a tubular rivet connection is provided wherein the rivet stem, either formed as a unitary or monolithic part of a first component or provided as a separate part that is welded to the first component, is provided for insertion through a rivet hole of a second component that rests against the first component and is to be riveted to the first component, wherein the free end of the tubular rivet stem of the first component projecting past the second component after insertion into the rivet hole can be deformed to a driven head resting against the second component.

The dependent claims disclose how the individual components of a transport and storage container for liquids of the aforementioned kind are furnished with the tubular rivet connections according to the invention.

The gist of the invention resides in that the tubular rivets and the matching rivet holes are integrated into the individual components of a transport and storage container for liquids and bulk material so that for connecting the components only one joining technique, i.e., riveting, is employed during assembly and separate tubular rivets with a rivet head are no longer required. In this way, the assembly expenditure is reduced and manufacturing costs are lowered.

DESCRIPTION OF THE PREFERRED EMBODIMENTS

Figure 1:
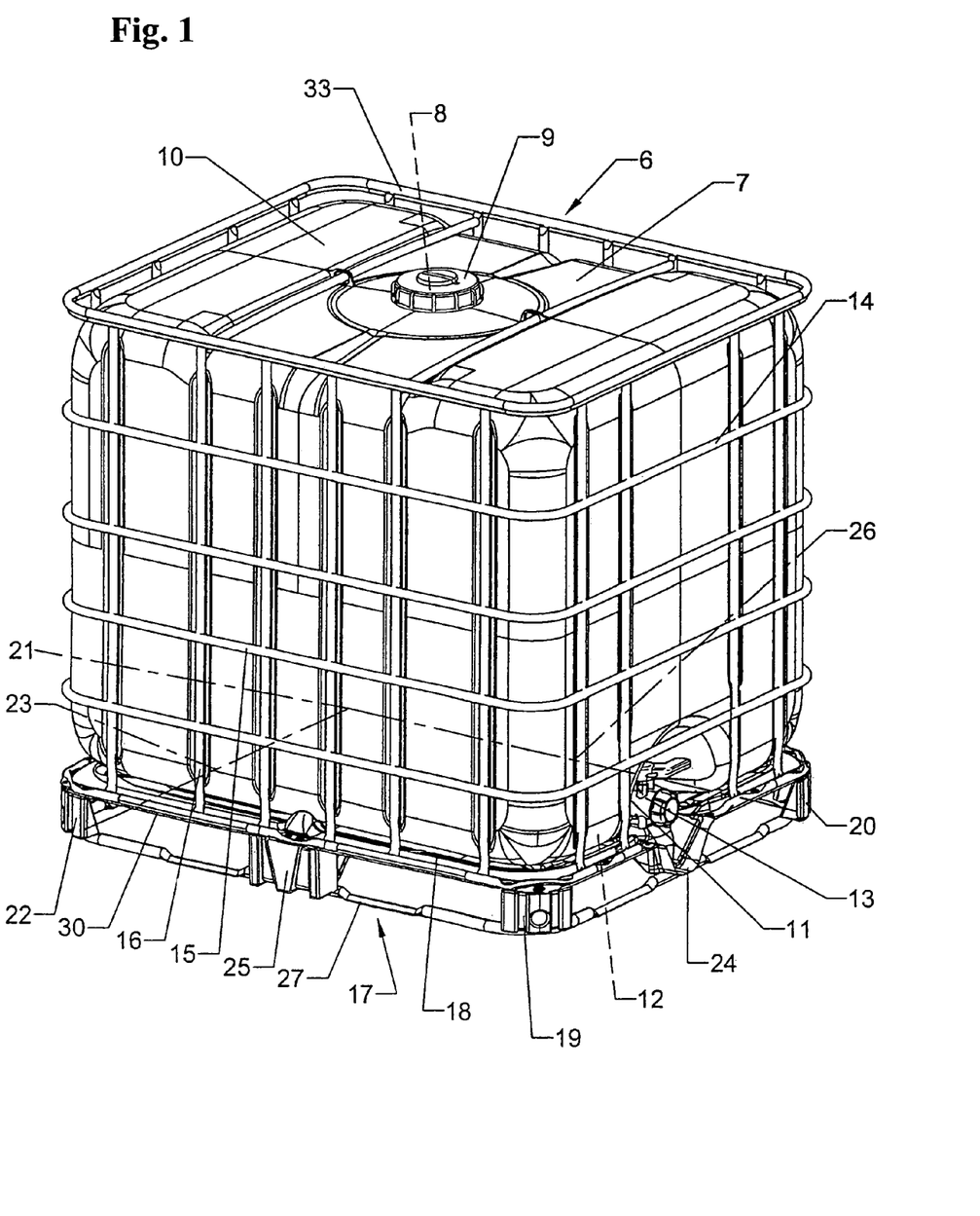
FIG. 1 is a perspective illustration of a transport and storage container for liquids with a pallet-like support frame of metal.
Figure 2:
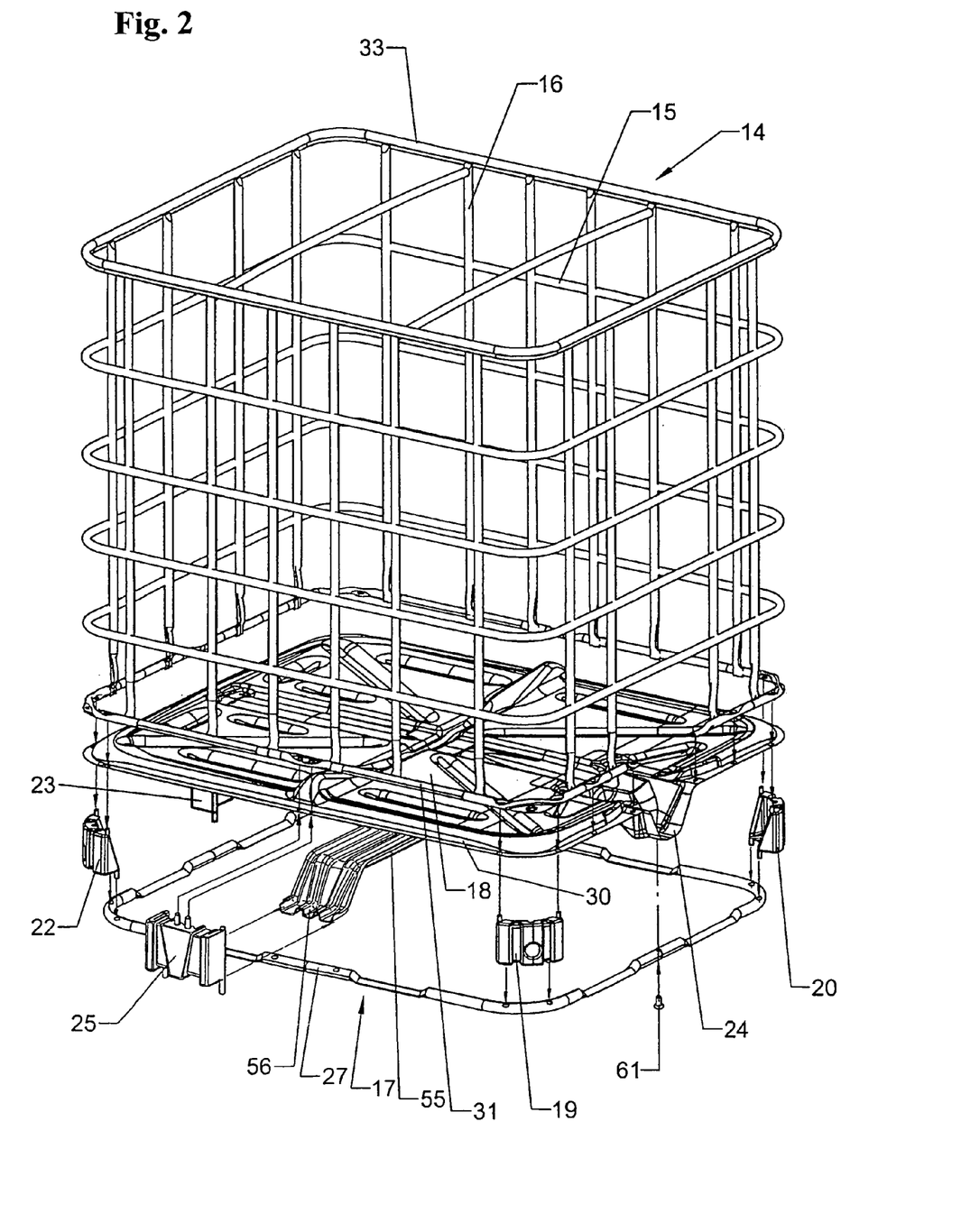
FIG. 2 is an exploded view of a transport and storage container according to FIG. 1 without inner container.

The transport and storage container 6 shown in FIGS. 1 and 2 used as a disposable or reusable container for liquids and flowable material has the following main components: an exchangeable parallelepipedal inner container 7 of plastic material that is provided with a filling socket 8 closable by a lid 9 at the top wall 10 and a discharge socket 11 in the area of the bottom 12 connectable to a discharge and rinsing faucet 13; an outer jacket formed as a grid basket 14 of crossing horizontal and vertical and grid bars 15, 16 made of metal; and a pallet-like support frame 17 made of metal having length and width measurements in accordance with the European pallet standard.

The pallet-like support frame 17 of the transport and storage container 6 designed for manipulation by a forklift, storage shelf operating device and similar transport means has a top 18 made of sheet metal for supporting the inner container. The top 18 of the support frame 17 rests on four corner legs 19-22 and a rear center leg 23 of sheet metal, a forward center leg 24 formed as a part of the top 18 and arranged underneath the discharge and rinsing faucet 13 of the inner container 7, as well as two lateral center legs 25, 26. The corner and center legs 19-26 of the support frame 17 are mounted on a base frame 27.

Figure 3:
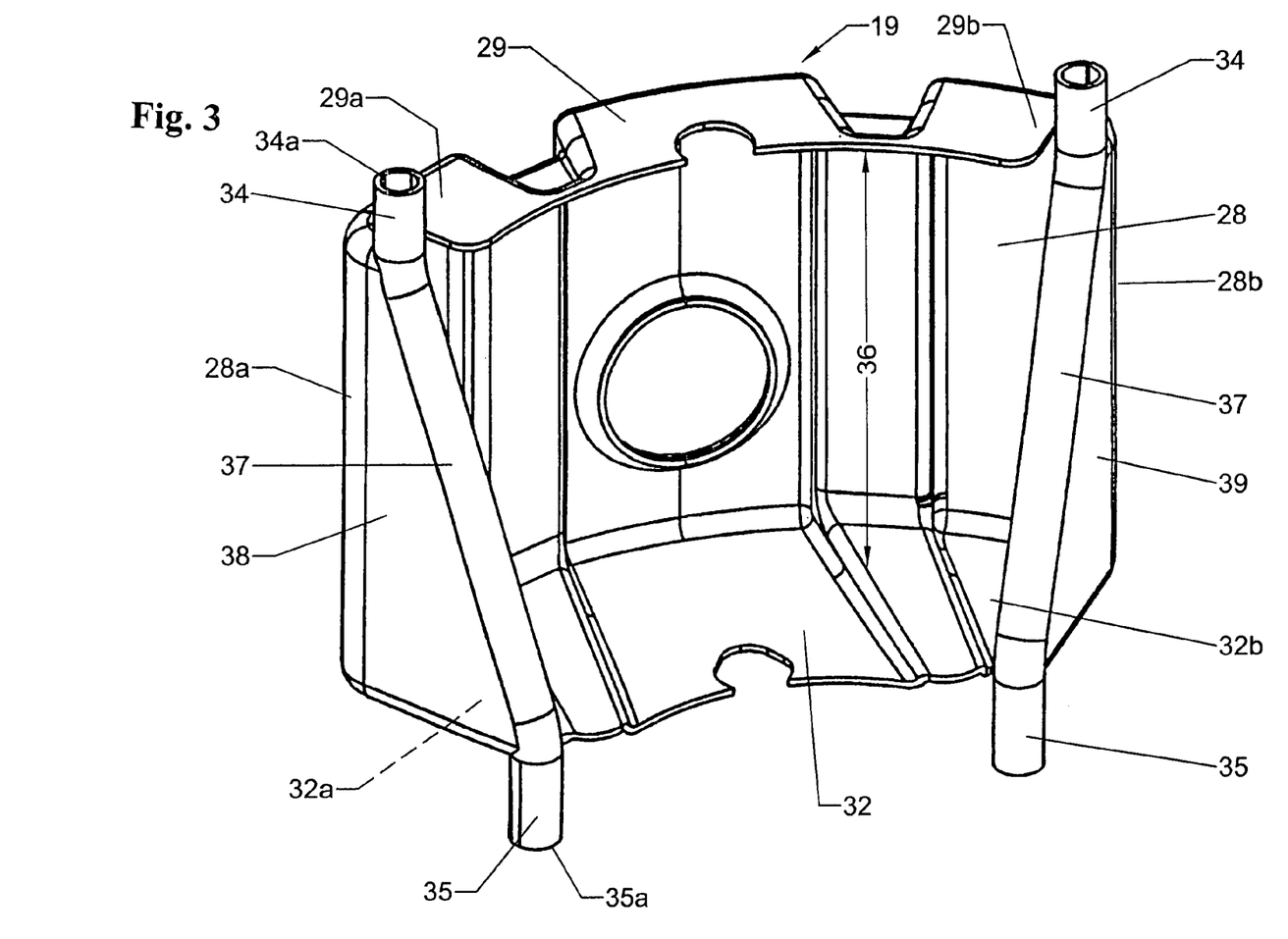
FIG. 3 is a perspective view of the interior of a first embodiment of a corner leg of the support frame of the transport and storage container in an enlarged illustration.
Figure 4:
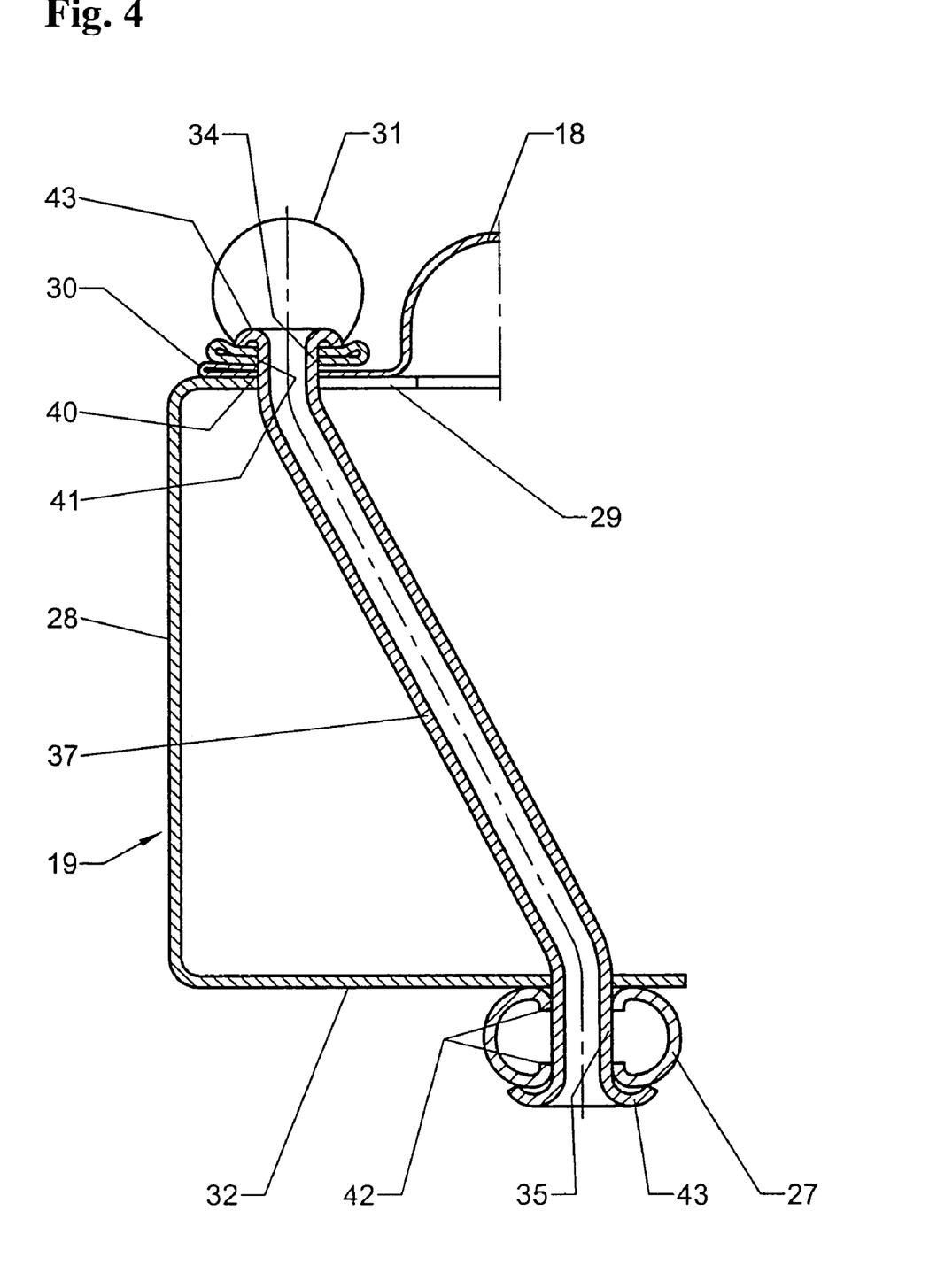
FIG. 4 shows an enlarged section view of the tubular rivet connection of the corner leg according to FIG. 3, illustrating the outer edge of the top of the support frame and the base frame of the grid basket as well as the base frame of the support frame connected to one another.

The corner leg 19 of the support frame 17 of the transport and storage container 6 according to FIGS. 3 and 4 is formed by a curved sheet metal part 28 and has a top support edge 29, provided for supporting the exterior edge 30 of the top 18 of the support frame 17 and the underframe 31 of the outer jacket formed as a grid basket 14, and a bottom support edge 32 with which the corner leg 19 rests on the base frame 27 of the support frame 17. When stacking several transport containers 6 on top of one another, the stacked transport container rests with the bottom support edge 32 of the corner legs 19-22 on the top frame 33 of the grid basket 14 of the transport container positioned underneath.

On the two outer sections 29a, 29b of the top support edge 29 of the sheet metal part 28 of the corner leg 19, there are two upper tubular rivet stems 34, 34 and on the two outer sections 32a, 32b of the bottom support edge 32 of the sheet metal part 28 there are two lower tubular rivet stems 35, 35. The upper and lower rivet stems 34, 35 project upwardly and downwardly past the corner legs 19. The lower rivet stems 35, 35 on the sheet metal part 28 of the corner leg 19 are staggered relative to the upper rivet stems 34, 34 parallel inwardly and in the vertical direction in accordance with the vertical spacing 36 of the upper support edge 29 to the bottom support edge 32 of the corner leg 19.

An upper rivet stem 34 and a lower rivet stem 35 of the corner leg 19 are formed by the two bent ends of the pipe section 37, respectively, wherein the pipe sections 37, 37 are formed, preferably by roll-forming, on two angled outer legs 38, 39 that have a slanted top edge and are connected to the outer edges 28a, 28b of the sheet metal part 28 of the corner leg 19.

In a modified embodiment of the corner leg 19 the pipe sections 37 are welded with an upper rivet stem 34 and a lower rivet stem 35, respectively, to the sheet metal part 28.

By means of the pipe sections 37 provided with upper and lower rivet stems 34, 35, respectively, and roll-formed on the inner side of the outer legs 38, 39 of the corner legs 19, the legs 38, 39 of the corner leg 19 are reinforced. As a result of this reinforcement, the corner legs 19-22 are protected from being damaged when inserting lifting arms of a transport device, for example, a forklift, into the support frame 17 of a transport and storage container 6 and moving the container by means of the lifting arms.

When assembling the support frame 17 and the grid basket 14 of the transport and storage container 6, the upper rivet stems 34 of the corner legs 19-22 are inserted through congruent rivet holes 40, 41 provided in the outer edge 30 of the top 18 and the underframe 31 of the grid basket 14 that is flattened in the area of the rivet holes 41 and the base frame 27 of the underframe 17 that is provided with matching rivet holes 42 and flattened in the area of holes 42 is placed onto the lower rivet stems 35 of the corner legs 19-22. Subsequently, the free ends 34a of the upper rivet stems 34 projecting past the underframe 31 of the grid basket 14, flattened in the area of the rivet holes 41, and the lower rivet stems 35 of the corner legs 19-22 projecting past the area of the rivet holes 42 of the flattened base frame 27 of the support frame 17 are deformed by a riveting tool to produce driven heads 43; in this way, the corner legs 19-22 are riveted fixedly to the bottom 18 and the underframe 31 of the grid basket 14 and also to the base frame 27.

Figure 5:
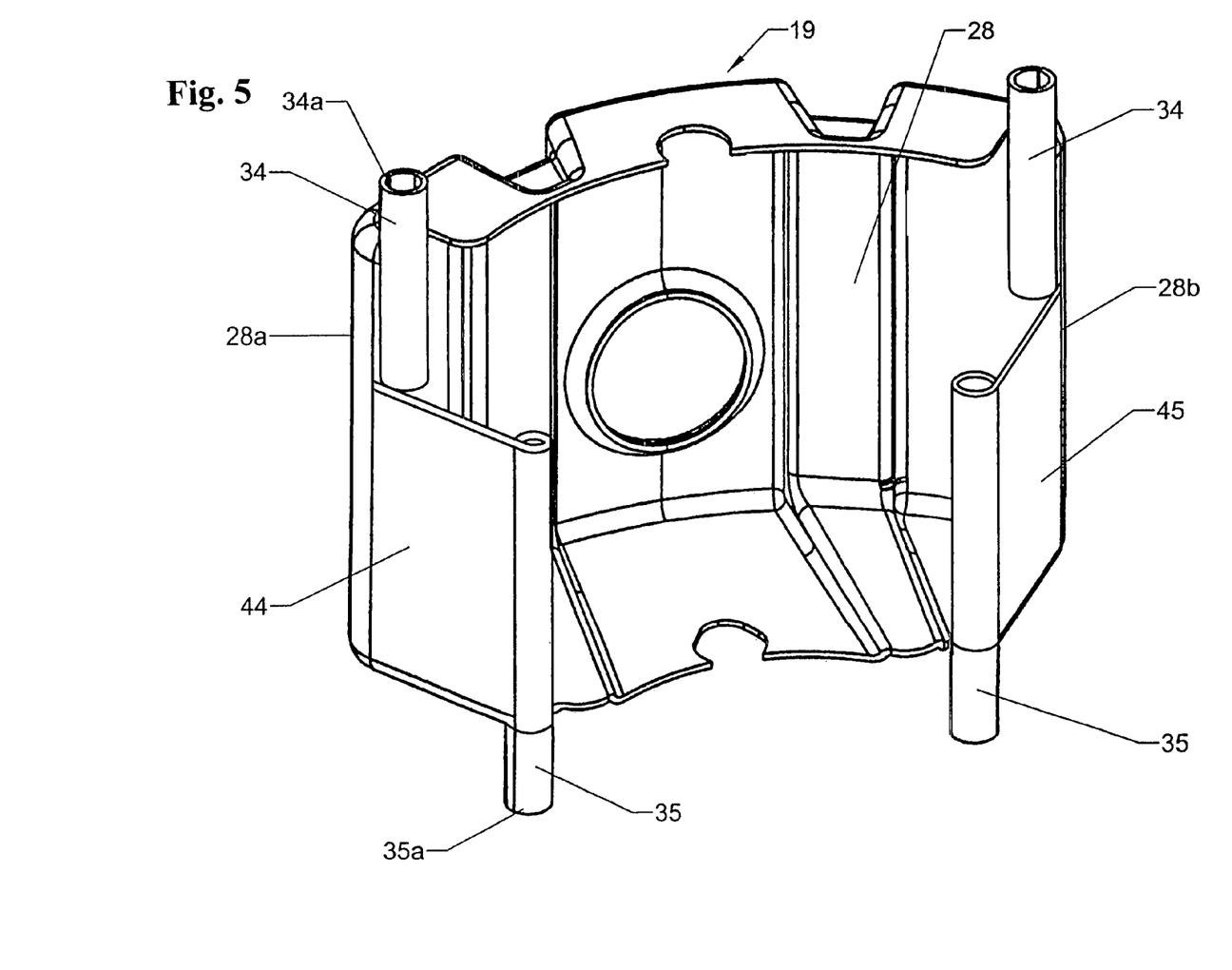
FIG. 5 is a perspective view of the interior of a second embodiment of a corner leg of the support frame of the transport and storage container in an enlarged illustration.

According to another embodiment of a corner leg 19 according to FIG. 5, the upper rivet stems 34, 34 are roll-formed on the two outer edges 28a, 28b of a sheet metal part 28 and the lower rivet stems 35, 35 are roll-formed on the inwardly angled outer legs 44, 45 of the two edges 28a, 28b of the sheet metal part 28.

Moreover, in the case of the corner leg 19 according to FIG. 5 there is the possibility of welding the upper and lower rivet stems 34, 35 onto the sheet metal part 28 and its legs 44, 45.

Figure 6:
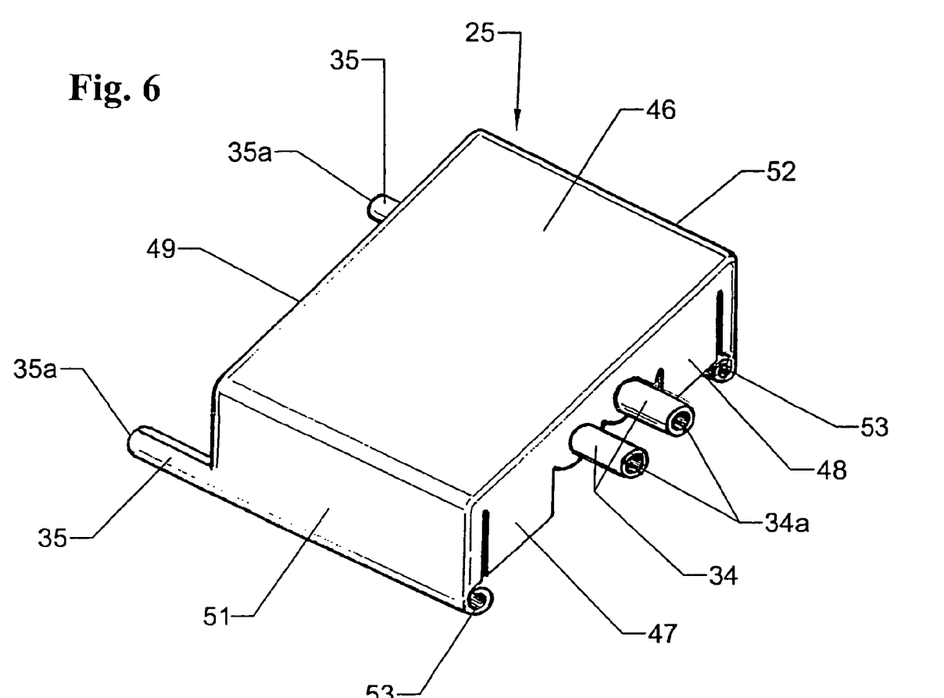
FIG. 6 is a perspective view of a first embodiment of a lateral center leg of the support frame of the transport and storage container in an enlarged illustration.
Figure 7:
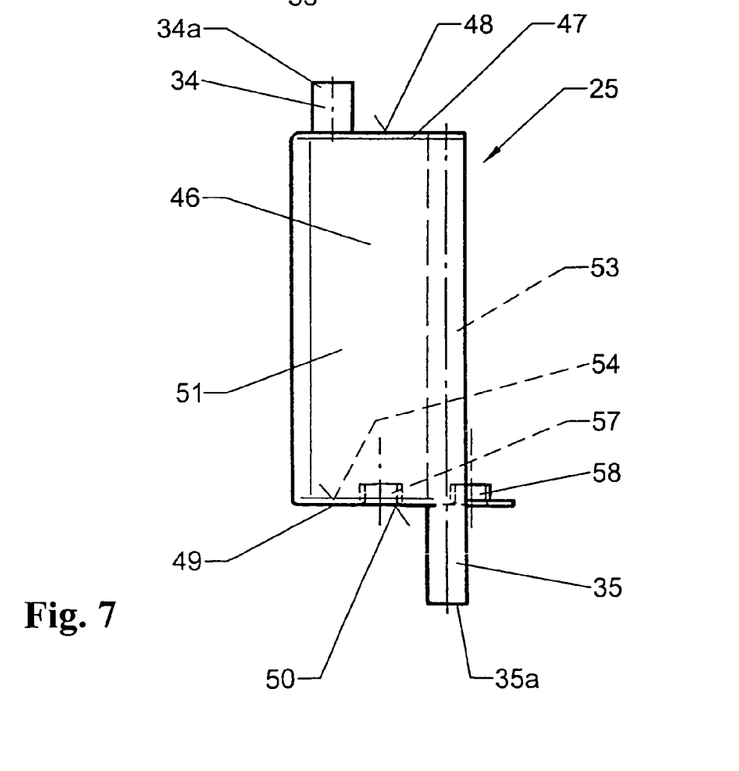
FIG. 7 is a side view of the lateral center leg according to FIG. 6.
Figure 8:
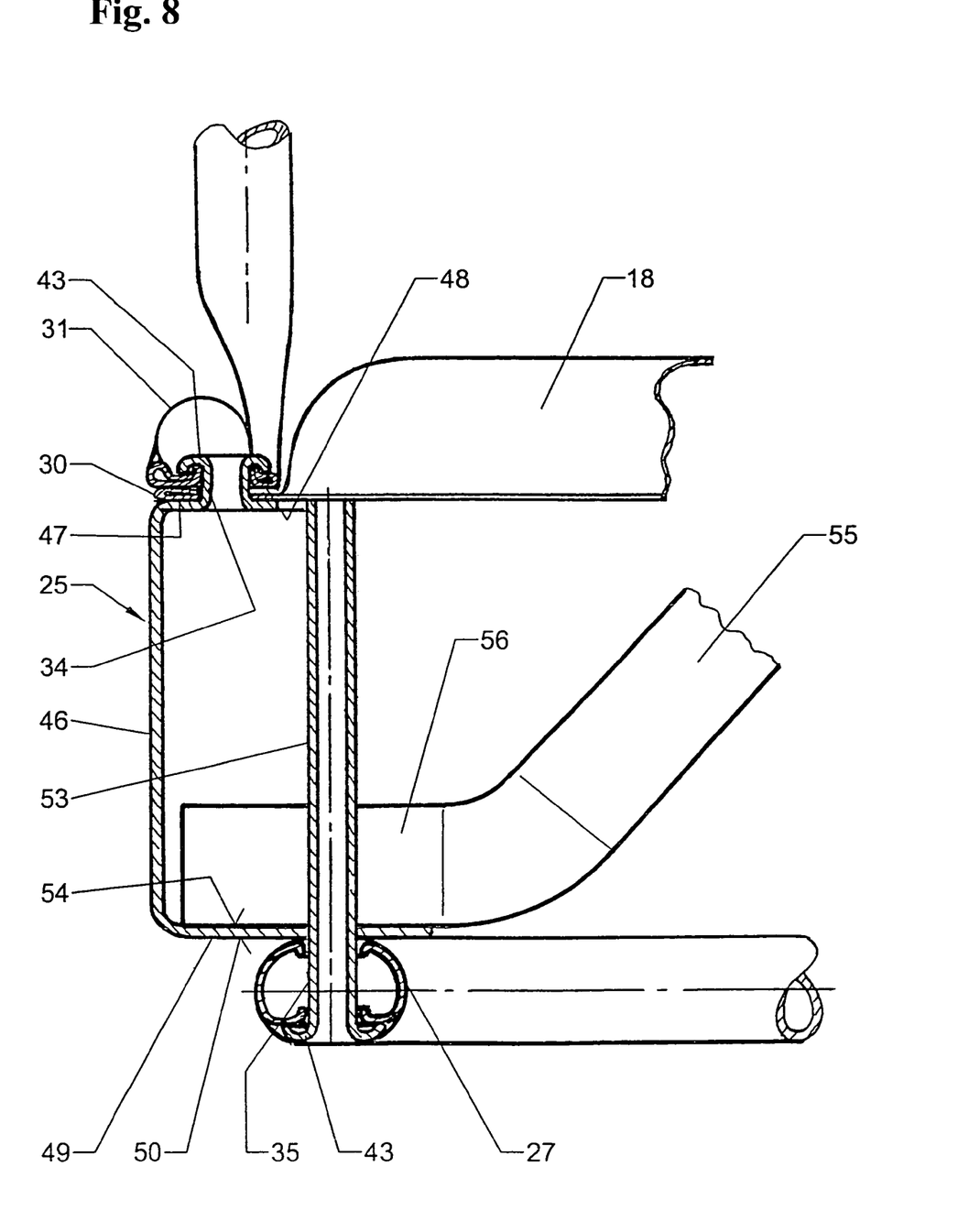
FIG. 8 is an enlarged section illustration of the tubular rivet connection of the center leg according to FIGS. 6 and 7, illustrating the outer edge of the top of the support frame and the underframe of the basket as well as the base frame of the support frame connected to one another.

The lateral center legs 25, 26, of which one (25) is illustrated in FIGS. 6 to 8, and the rear center leg 23 of the support frame 17 have the shape of an open box 46 with an upper wall 47 providing a support surface 48 and a lower wall 49 provided with a contact surface 50, as well as two pipe sections 53, 53 roll-formed on the two sidewalls 51, 52 of the box 46. The pipe sections 53, 53 each have a lower rivet stem 35. Two rivet stems 34, 34 are roll-formed on the support surface 48 of the upper box wall 47. The center legs 23, 25, 26 are riveted by means of the upper and lower rivet stems 34, 35, whose free ends 34a, 35a are deformed to driven heads 43, to the outer edge 30 of the bottom 18 and the underframe 31 of the grid basket 14 resting thereon as well as to the base frame 27 in the same way as the corner legs 19-22.

The lower wall 49 of the two lateral center legs 25, 26 has on its inner side a support surface 54 for one of the two downwardly extending ends 56, respectively, of a central reinforcement stay 55 of the support frame top 18. On the lower box wall 49 of the center legs 25, 26 there are also two inwardly oriented hollow rivet stems 57, 58 for riveting the center legs to the ends 56 of the reinforcement stay 55 of the support frame bottom 18 (FIGS. 2, 6-8).

In place of the rivets, the lateral center legs 25, 26 can be connected to the ends 56 of the reinforcement stay 55 of the support frame top 18 by a joining method known as clinching. Moreover, there is the possibility of welding separate sleeves as rivet stems 34, 35, 57, 58 to the lateral center legs 25, 26.

Figure 9:
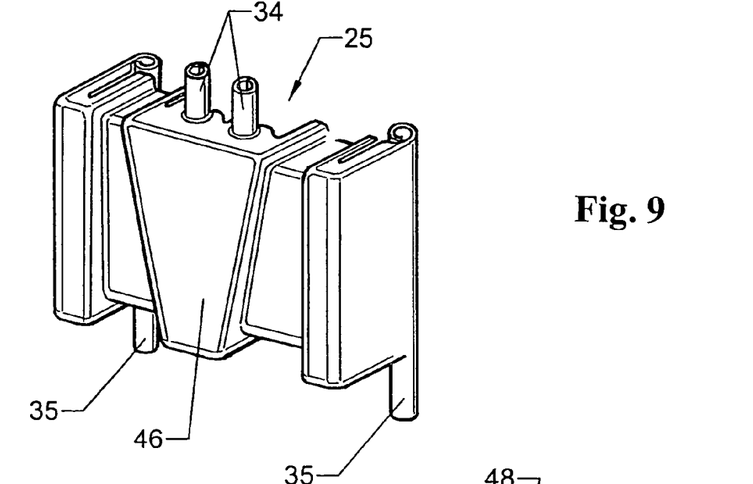
FIG. 9 is a perspective illustration of a second embodiment of a center leg of the support frame of the transport and storage container in an enlarged illustration.

FIG. 9 shows a lateral center leg 25 of the support frame 17 with a segmented monolithic box shape 46.

Figure 10:
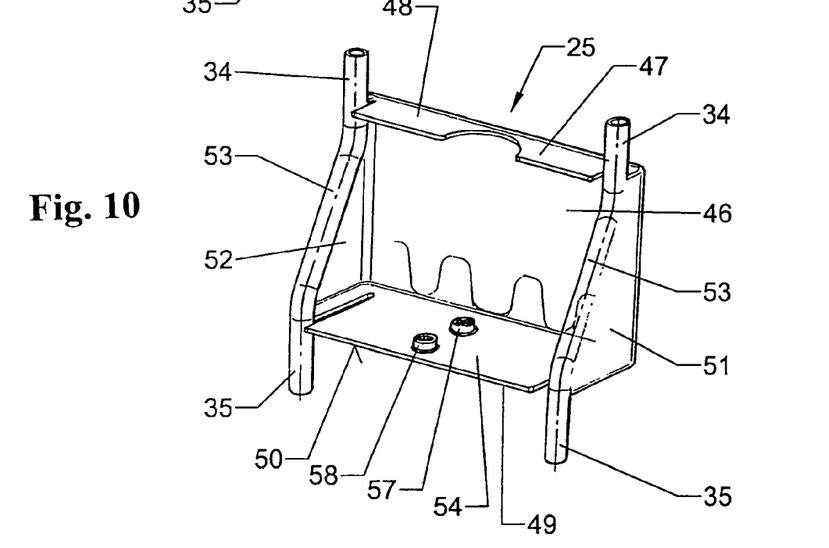
FIG. 10 is a perspective illustration of a third embodiment of a center leg of the support frame in an enlarged illustration.

The lateral center leg 25 of the support frame 17 illustrated in FIG. 10 has the shape of an open box 46 with a top wall 47 providing a support surface 48 and a bottom wall 49 provided with a contact surface 50 as well as two pipe sections 53, 53 that are roll-formed on the two sidewalls 51, 52 of the box 46 that have a slanted top edge. Two angled pipe ends form upper and lower rivet stems 34, 35, respectively. The lower wall 49 of the lateral center leg 25 has an inner support surface 54 for one of the two ends 56 of the central reinforcement stay 55 of the support frame top 18 as well as two rivet stems 57, 58 for riveting the center leg to an end 56 of the reinforcement stay 55.

Figure 11:
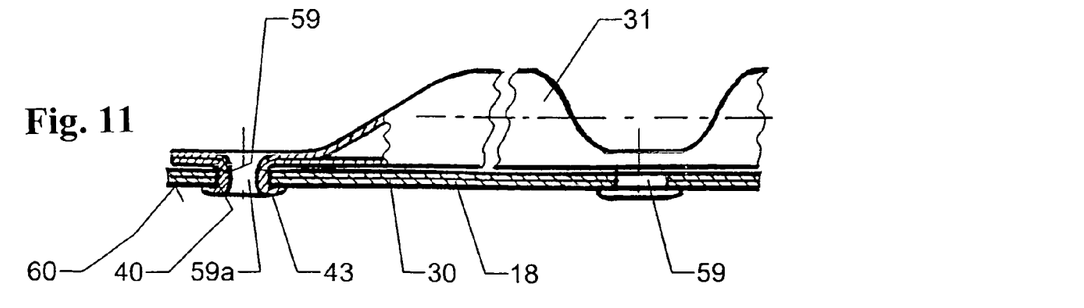
FIG. 11 shows the tubular rivet connections of the support frame of the grid basket to the outer edge of the bottom of the support frame in the area of the forward discharge depression in an enlarged illustration.

According to FIG. 11, for connecting the underframe 31 of the grid basket 14 to the support frame top 18 on both sides of the forward center leg 24 formed as a monolithic part of the bottom 18, two tubular rivet stems 59, 59 formed on the underframe 31 are provided that are pushed through rivet holes 40 in the outer edge 30 of the bottom 18 and whose free ends 59a are deformed by means of a rivet tool against the underside 60 of the bottom edge 30 to form driven heads 43.

Instead of rivet stems 59 formed on the underframe 31 of the grid basket 14, separate tubular rivets can be used for riveting the underframe of the grid basket to the support frame bottom 18.

According to FIG. 2, the forward center leg 24 of the support frame 17 is attached by means of a tubular rivet 61 provided with a rivet head onto the base frame 27.

Figure 12:
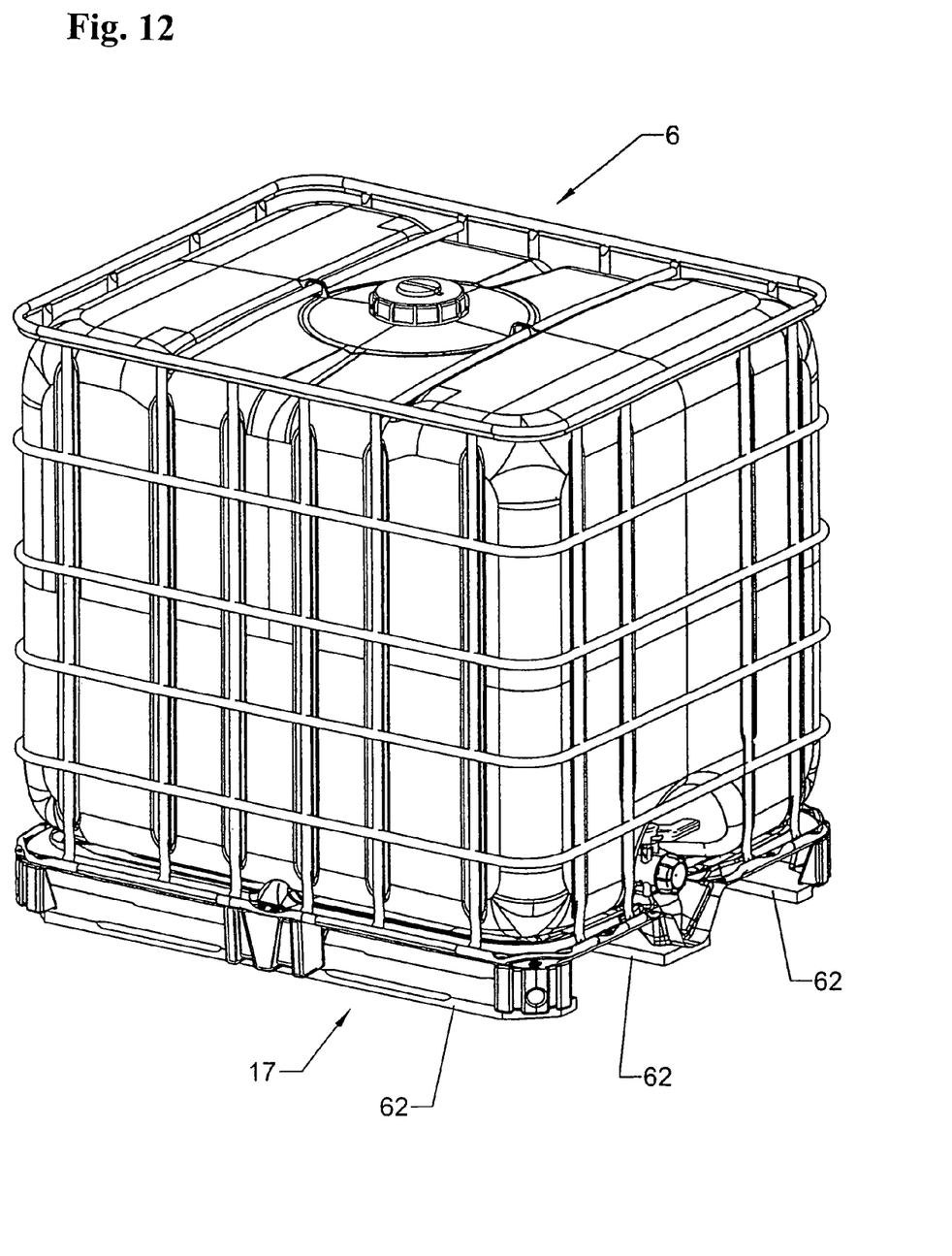
FIG. 12 is a perspective illustration of a transport and storage container with a support frame provided with wooden skids.

FIG. 12 shows a transport and storage container 6 for liquids whose support frame 17 is provided with wooden skids 62.

Figure 13:
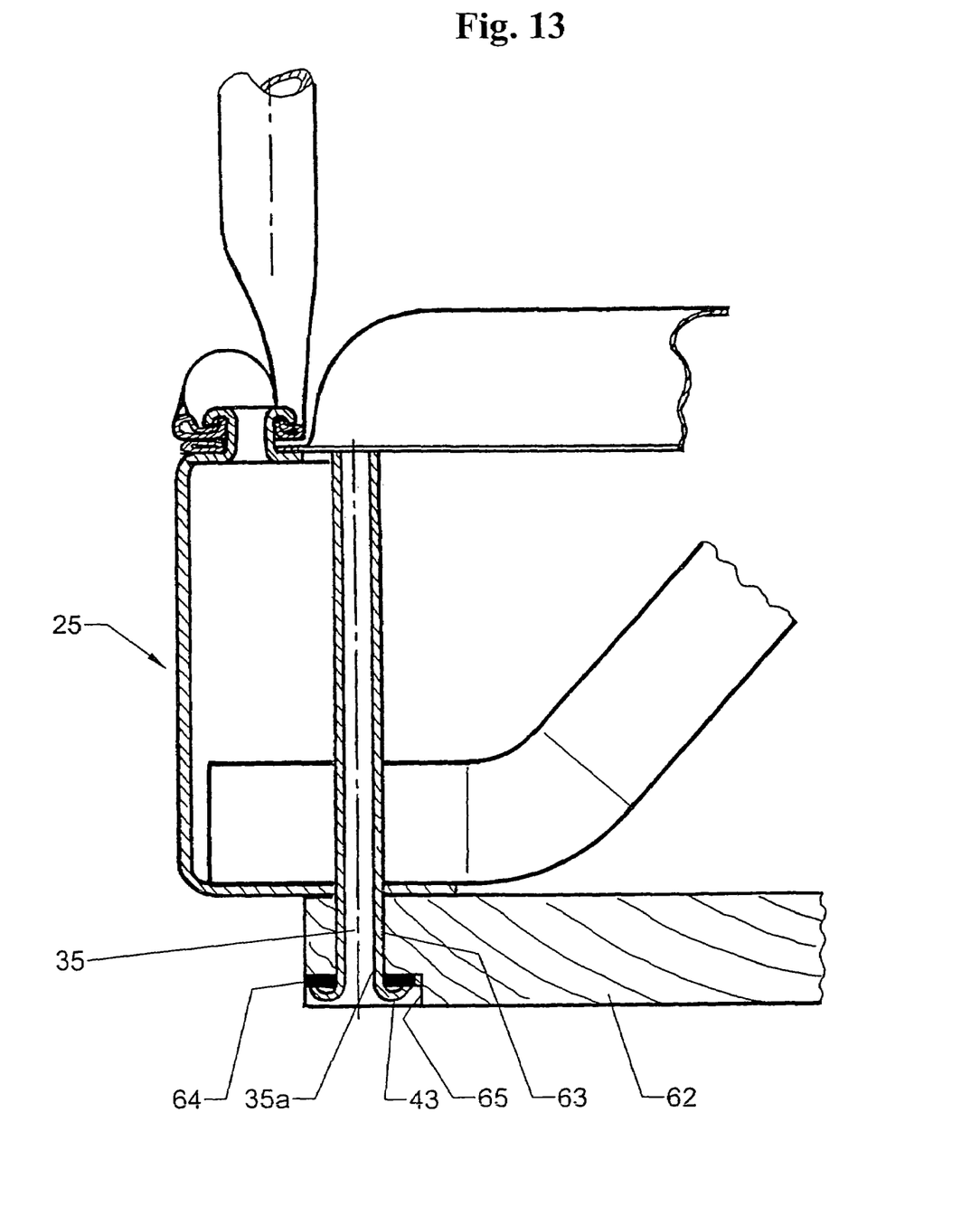
FIG. 13 is a perspective sectional view of the wood rivet connections of a lateral center leg to the outer edge of the top of the support frame and the underframe of a grid basket as well as to a wooden skid of the support frame of the container according to FIG. 12.

For attaching the center leg 25 of the underframe 17 illustrated in FIG. 13 to a wooden skid 62 of the support frame 17, the two lower rivet stems 35 of the center leg 25 are inserted through corresponding counterbores 63 of the wooden skids 62. Subsequently, a washer 64 can be pushed onto the free ends 35a of the rivet stems 35 projecting from the wooden skids 62, respectively, and subsequently the ends 35a of the rivet stems 35 can be deformed by a rivet tool to driven heads 43 that are sunken in the recess 65 of the counterbores 63.

In the same way, the second lateral center leg 26 and the rear center leg 23 as well as the four corner legs 19-22 are mounted on the wooden skids 62 of the support frame 17. For attaching the forward center leg 24 to the wooden center skid 62 of the support frame 17, a tubular rivet provided with a rivet head is used.

While specific embodiments of the invention have been shown and described in detail to illustrate the inventive principles, it will be understood that the invention may be embodied otherwise without departing from such principles.

What is claimed is:

1. A transport and storage container for liquids and flowable material, the transport and storage container comprising:
   a pallet-like support frame,
   an inner container of plastic material that rests on the support frame and comprises a closable filling socket and a discharge socket to be connected to a discharge fitting, and
   an exterior jacket in the form of a grid basket or a sheet metal jacket,
   wherein the support frame has a top supporting the inner container and has corner legs and center legs made of metal that are mounted on top of an underframe made of metal or skids made of metal, plastic or wood, wherein the top of the support frame, the underframe and the exterior jacket of the inner container are attached to the corner legs and the center legs by tubular rivet connections,
   each tubular rivet connection having at least one tubular rivet stem formed as a monolithic part of or welded to one of a top side or a bottom side of one of the corner legs and the center legs and project upwardly or downwardly from the top side or the bottom side, respectively, and rivet holes provided in the exterior jacket, the top of the pallet-like support frame and the underframe to receive free ends of the tubular rivet stems, wherein each tubular rivet stem passes through at least one of the rivet holes and is deformed to a driven head to provide fastening,
   wherein each tubular rivet connection fastens the exterior jacket and an exterior edge of the top of the support frame to one of the corner legs or center legs or fastens one of the corner legs or center legs to the underframe.

2. The transport and storage container according to claim 1, wherein the corner legs each comprise a curved sheet metal part having a top support edge and a bottom support edge, wherein the top support edges and the bottom support edges are provided with outer sections and wherein the tubular rivet stems that projects upwardly and downwardly are connected to the outer sections, respectively.

3. The transport and storage container according to claim 2, wherein, relative to the tubular rivet stems that project upwardly, the tubular rivet stems that project downwardly are staggered parallel inwardly and, in a vertical direction, in accordance with a vertical spacing of the upper support edge to the bottom support edge of the corner leg.

4. The transport and storage container according to claim 3, wherein the curved sheet metal part has outer edges provided with inwardly angled legs and wherein the tubular rivet stems that project downwardly are connected to the inwardly angled legs.

5. The transport and storage container according to claim 2, wherein the curved sheet metal part has outer edges and inwardly angled legs connected to the outer edges, wherein the inwardly angled legs each have a pipe section welded or roll-formed on the inwardly angled legs, wherein the pipe sections have upper and lower bent ends and the bent ends are the tubular rivet stems projecting upwardly and downwardly, respectively.

6. The transport and storage container according to claim 1, wherein two of the center legs are laterally arranged on the support frame and wherein one of the center legs is arranged rearwardly on the support frame, wherein the two laterally arranged center legs and the rearwardly arranged center leg each have a box shape, the two laterally arranged center legs and the rearwardly arranged center leg each having an upper wall forming a support surface, a bottom wall forming a contact surface, and sidewalls, wherein the sidewalls have pipe sections welded or rollformed on the sidewalls, wherein the pipe sections each have a lower end and the lower ends are the tubular rivet stems projecting downwardly, wherein the tubular rivet stems projecting upwardly are connected to the upper walls, respectively.

7. The transport and storage container to claim 6, wherein the lower wall of the two laterally arranged center legs has an inner side provided with a support surface and at least one inwardly oriented hollow rivet stem formed on the lower wall, wherein the bottom of the support frame comprises a reinforcement stay having two downwardly bent outer ends that are supported on the support surface of the lower wall of the two laterally arranged center legs, respectively, wherein the at least one inwardly oriented hollow rivet stem formed on the lower wall is configured to rivet the bent outer ends of the reinforcement stay to the two laterally arranged center legs.

8. The transport and storage container according to claim 1, wherein two of the center legs are laterally arranged on the support frame and have a box shape, the two laterally arranged center legs each having an upper wall forming a support surface and a lower wall forming a contact surface, and sidewalls having a slanted top edge, wherein the sidewalls have pipe sections welded or roll-formed on the slanted top edge, wherein the pipe sections each have upper and lower bent ends and the bent ends are the tubular rivet stems projecting upwardly and downwardly, respectively.

9. The transport and storage container according to claim 8, wherein the lower wall of the two laterally arranged center legs has an inner side provided with a support surface and at least one inwardly oriented hollow rivet stem formed on the lower wall, wherein the bottom of the support frame comprises a reinforcement stay having two downwardly bent outer ends that are supported on the support surface of the lower wall of the two laterally arranged center legs, respectively, wherein the at least one inwardly oriented hollow rivet stem formed on the lower wall is configured to rivet the bent outer ends of the reinforcement stay to the two laterally arranged center legs.

10. The transport and storage container according to claim 1, wherein the at least one tubular rivet stem is rollformed on the corner legs and the center legs of the support frame.

* * * * *